(12) United States Patent
Wang et al.

(10) Patent No.: US 9,874,463 B2
(45) Date of Patent: Jan. 23, 2018

(54) OPTICAL ENCODER FOR PREVENTING CROSSTALK

(71) Applicant: FANUC CORPORATION, Minamitsuru-gun, Yamanashi (JP)

(72) Inventors: Miaomiao Wang, Yamanashi (JP); Nobuyuki Ootake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 44 days.

(21) Appl. No.: 15/008,683

(22) Filed: Jan. 28, 2016

(65) Prior Publication Data
US 2016/0223366 A1 Aug. 4, 2016

(30) Foreign Application Priority Data

Jan. 29, 2015 (JP) ................................. 2015-016038

(51) Int. Cl.
*G01D 5/34* (2006.01)
*G01D 5/347* (2006.01)

(52) U.S. Cl.
CPC ....... *G01D 5/3473* (2013.01); *G01D 5/34715* (2013.01)

(58) Field of Classification Search
CPC ............. G01D 5/3473; G01D 5/34707; G01D 5/34715

USPC ............. 250/231.13, 231.14, 231.16, 231.18
See application file for complete search history.

(56) References Cited

U.S. PATENT DOCUMENTS

| 5,572,019 A | 11/1996 | Sakuma |
| 6,407,378 B1 | 6/2002 | Sakaguchi |
| 2016/0153810 A1* | 6/2016 | Ootake ............. G01D 5/34792 250/231.13 |

FOREIGN PATENT DOCUMENTS

| DE | 19960890 A1 | 7/2000 |
| JP | S62-007174 A | 1/1987 |
| JP | 63042420 | 2/1988 |
| JP | 2000205894 | 7/2000 |
| JP | 2003065802 | 3/2003 |
| JP | 2004347382 | 12/2004 |
| JP | 2005207758 | 8/2005 |
| JP | 2007071634 | 3/2007 |
| WO | 2014-203314 A1 | 12/2014 |

\* cited by examiner

*Primary Examiner* — Kevin Pyo
(74) *Attorney, Agent, or Firm* — RatnerPrestia

(57) ABSTRACT

In an optical encoder which includes a rotary plate formed with a plurality of slit arrays and a plurality of light receiving parts corresponding to the slit arrays, at least one of the outer edge of a light receiving part located on the outer side of the optical axis X of light emitted from a light emitting part and the inner edge of the light receiving part located on the inner side of the optical axis X is positioned at a greater distance from the optical axis than the edge of the slit array corresponding to the light receiving part.

3 Claims, 5 Drawing Sheets

OPTICAL ENCODER FOR PREVENTING CROSSTALK

BACKGROUND OF THE INVENTION

1. Field of the Invention

The present invention relates to an optical encoder.

2. Description of the Related Art

Optical encoders are used to acquire information on the motion of a moving object, such as the moving direction, position, velocity and the like. For example, a known optical encoder used together with a rotational object detects light passing through rotational slits that rotate together with the rotational object by means of a light receiving part to acquire information on the rotational motion of the rotational object.

In a conventional optical encoder, a light receiving part is arranged in alignment with rotational slits. Specifically, in order to increase the output level of the detection signal, the rotational slits and the light receiving part are arranged so that their edges are aligned with each other so as to allow the light going straight through the rotational slits to reach the light receiving part.

JP S62-007174A discloses a rotational angle detecting device in which the arrangement length of a light receiving element array is larger than the pitch of slit array formed on a rotary slit plate, in consideration of the fact that light emitted from a point light source reaches the light receiving element array while spreading. This related art is intended to prevent an insensitive area from being formed so as to improve detecting accuracy of the rotational angle.

In an optical encoder that is configured to detect light beams that have passed through a plurality of slits separately from one another, crosstalk may occur due to light beams passing through neighboring slits. FIG. 5 shows a positional relationship between a slit array and a light receiving part in an encoder according to the related art. A rotary plate 100 is formed with five slit arrays 101 to 105 spaced apart from each other. A light detecting unit 200 arranged to face the rotary plate 100 includes light receiving parts 201 to 205 corresponding to slit arrays 101 to 105, respectively.

The slit arrays 101 to 105 and corresponding light receiving parts 201 to 205 have common central axis lines A1 to A5, respectively, and extend in the same range. Accordingly, as indicated by the dashed lines in FIG. 5, the edges of the slit arrays 101 to 105 are aligned with the edges of the corresponding light receiving parts 201 to 205.

FIG. 6 shows an exemplary behavior of the light emitted from a light emitting part in an encoder according to the related art. As illustrated, the light emitted from a light emitting part 300 is not a perfect collimated beam (light directed parallel to the optical axis 310). Light L1 directed at an angle to the optical axis 310 passes through a rotational slit 102, but reaches a different light receiving part 201 which is adjacent to a light receiving part 202 corresponding to the rotational slit 102. Similarly, light L2 directed at an angle to the optical axis 310 passes through a rotational slit 104 and reaches a different, adjacent light receiving part 205, instead of the corresponding light receiving part 204.

In this way, if light having passed through a rotational slit different from the corresponding rotational slit reaches the light receiving part, the output signal from the light receiving part will be affected (which will be hereinafter simply referred to as "light crosstalk"). As a result, the detection accuracy of the encoder degrades.

Therefore, there is a need for an optical encoder which can prevent light crosstalk from occurring.

SUMMARY OF THE INVENTION

According to a first aspect of the present invention, there is provided an optical encoder comprising: a movable slit part that is movable integrally with a target object to be measured and has a plurality of slit arrays spaced apart from one another; a light emitting part configured to emit light toward the plurality of slit arrays; and, a plurality of light receiving parts arranged so as to correspond to the plurality of slit arrays and to detect light which is emitted from the light emitting part and passes through the plurality of slit arrays, wherein at least one light receiving part of the plurality of light receiving parts has an inner edge located on an inner side relative to an optical axis of the light emitted from the light emitting part and an outer edge located on an outer side relative to the optical axis, at least one of the inner edge and the outer edge being disposed at a greater distance from the optical axis than an edge of a slit array corresponding to the at least one light receiving part.

According to a second aspect of the present invention, there is provided the optical encoder according to the first aspect, wherein the at least one the light receiving part is disposed within a range defined by a pair of light blocking parts that extend adjacent to opposite sides of the slit array corresponding to the at least one light receiving part and that do not allow light to pass therethrough.

According to a third aspect of the present invention, there is provided the optical encoder according to the first or second aspect, wherein a width of the at least one light receiving part extending in a direction perpendicular to the optical axis is equal to a width of the slit array corresponding to the at least one light receiving part.

According to a fourth aspect of the present invention, there is provided the optical encoder according to any one of the first to three aspects, wherein a width of the at least one light receiving part extending in a direction perpendicular to the optical axis is greater than a width of the slit array corresponding to the at least one light receiving part, and wherein the inner edge of the at least one light receiving part and the edge of the slit array corresponding to the at least one light receiving part are positioned at the same distance from the optical axis.

These and other objects, features and advantages of the present invention will become more apparent in light of the detailed description of exemplary embodiments thereof as illustrated in the drawings.

DETAILED DESCRIPTION

Figure 1:
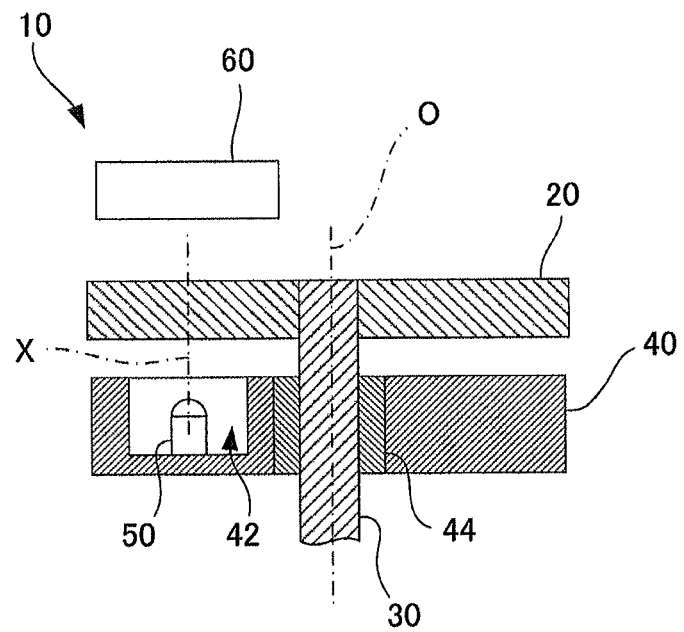
FIG. 1 is a schematic diagram showing an optical encoder according to one embodiment.

Referring now to the accompanying drawings, embodiment of the present invention will be described. The size of the constituent elements of the illustrated embodiment may be changed in relation to one another as necessary to facilitate understanding of the present invention. Further, the same and corresponding constituents are allotted with the same reference numerals.

FIG. 1 is a schematic diagram showing an optical encoder according to one embodiment. An optical encoder 10 is a rotary encoder that is used to acquire information relating to rotational motion of a rotating axis 30, such as the direction of rotation, angular position of rotation, rotational speed and the like. The optical encoder 10 includes a rotary plate 20, a housing part 40, a light emitting part 50 and a light detecting unit 60.

The rotational axis 30 is a generally cylindrical member capable of rotating about a rotational axis line O, and is a target object to be measured by the optical encoder 10 in the present embodiment. The rotational axis 30 may be, for example, an output axis of an electric motor (not shown), or may be another axis directly or indirectly coupled with the output axis. The rotary plate 20 is attached to the outer circumference of the rotational axis 30 so that the rotary plate 20 can rotate together with the rotational axis 30. The rotary plate 20 includes a light transmissive part for transmitting light emitted from the light emitting part 50 and a light blocking part for preventing light from transmitting, as further described below.

The housing part 40 is a part that is fixed independently of the rotational motion of the rotational axis 30 and the rotary plate 20. A bearing 44 is provided in the inner circumference of the housing part 40. The bearing 44 rotatably supports the rotational axis 30. The housing part 40 has a recessed portion 42 that is depressed toward the opposite side of the rotary plate 20 so as to accommodate the light emitting part 50.

The light emitting part 50 is configured to emit light in a predetermined direction (in the direction of the optical axis X). The light emitting part 50 is disposed in the recessed portion 42 of the housing part 40 so as to emit light toward the light detecting unit 60. The light emitting part 50 may be a light emitting diode, for example. The light emitting part 50 may include a lens for converting the emitted light into collimated light.

The light detecting unit 60 is arranged on the opposite side of the light emitting part 50 in relation to the rotary plate 20 so as to face the light emitting part 50. The light detecting unit 60 is configured to detect light from the light emitting part 50 which passes through the light transmissive part of the rotary plate 20 and output corresponding electric signals. For example, the light detector 60 includes a plurality of photodiodes that can detect light independently of each other.

The optical encoder 10 detects the light which is emitted from the light emitting part 50, passes through the light transmissive part of the rotary plate 20 and reaches the light detector 60 to acquire information on the rotational motion of the rotational axis 30. Since the operating principle of the optical encoder 10 is well known in the art, detailed description is omitted in the present specification.

Figure 2A:
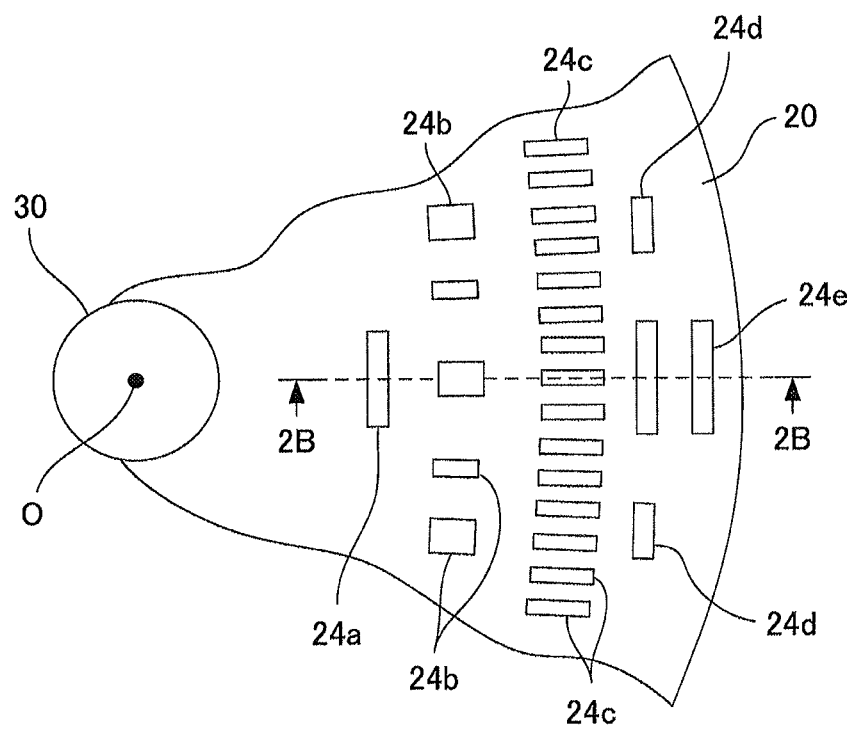
FIG. 2A is a top view showing part of a rotary plate.
Figure 2B:
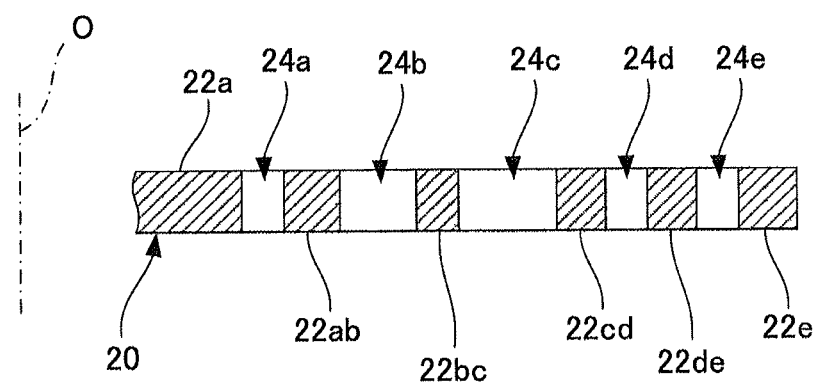
FIG. 2B is a partial section cut along a line 2B in FIG. 2A.

Referring to FIGS. 2A and 2B, an exemplary configuration of the rotary plate 20 will be described in detail. FIG. 2A is a top view showing part of the rotary plate 20. FIG. 2B is a partial section cut along a line 2B in FIG. 2A. The rotary plate 20 is formed with a plurality of slit arrays 24a to 24e that penetrate through the rotary plate 20 in the direction parallel to the rotational axis line O. Each of the slit arrays 24a to 24e includes a plurality of slits that are at the same distance away from the rotational axis line O. In other words, the slits of each of the slit arrays 24a to 24e are arranged on the circumference around the rotational axis line O. Alternatively, at least one of the slit arrays 24a to 24e may include only a single slit. Each of the slit arrays 24a to 24e functions as the light transmissive part that transmits the light directed from the light emitting part 50 to the light detecting unit 60.

The slit arrays 24a to 24e are each provided in order to acquire information on the rotational motion of the rotational axis 30. The slit arrays 24a to 24e are different from one another at least either in pitch or in size so as to be able to obtain different kinds of information. For the sake of convenience, in the following description of the embodiment, the slit arrays arranged in the proximity of the rotational axis line O and on the radially outside therefrom will be referred to as "the first slit array," "the second slit array," "the third slit array," "the fourth slit array" and "the fifth slit array," respectively.

Referring to FIG. 2B, light blocking parts 22ab, 22bc, 22cd and 22de are formed between two neighboring slit arrays of the slit arrays 24a to 24e. Further, a light blocking part 22a is formed on an inner side of the first slit array 24a, and a light blocking part 22e is formed on an outer side of the fifth slit array 24e.

Figure 6:
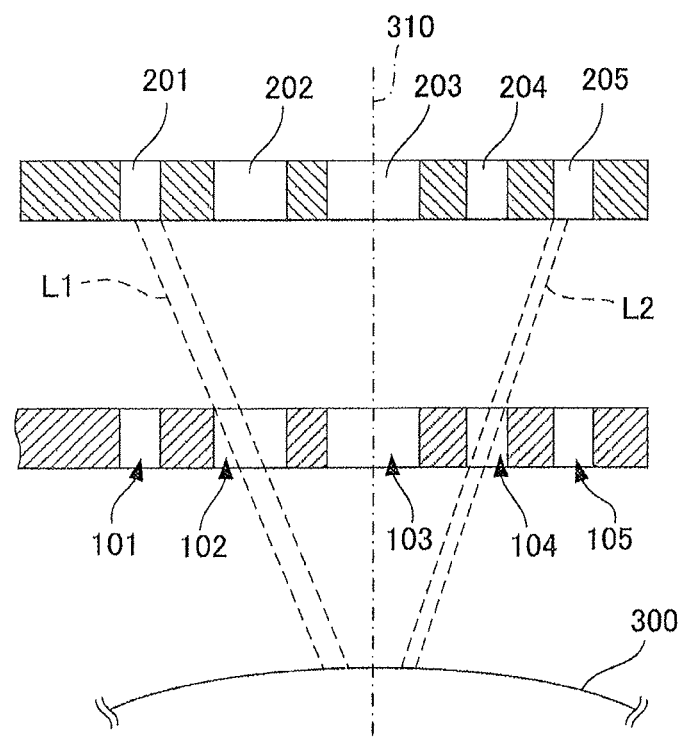

As described above with reference to FIG. 6, in the case of the encoder configured to detect light beams passing through corresponding slit arrays, independently of each other, a light crosstalk may occur, in which a light beam passing through a slit array adjacent to the corresponding slit array is erroneously detected. In order to prevent the crosstalk, according to the present embodiment, light receiving parts (effective area capable of detecting light) of the light detecting unit are positioned at a greater distance from the optical axis than the corresponding slit arrays. In other words, the light detecting unit is configured so that central axis line of the light receiving part extending parallel to the optical axis is located at a greater distance from the optical axis than the central axis line of the corresponding slit array.

Figure 3A:
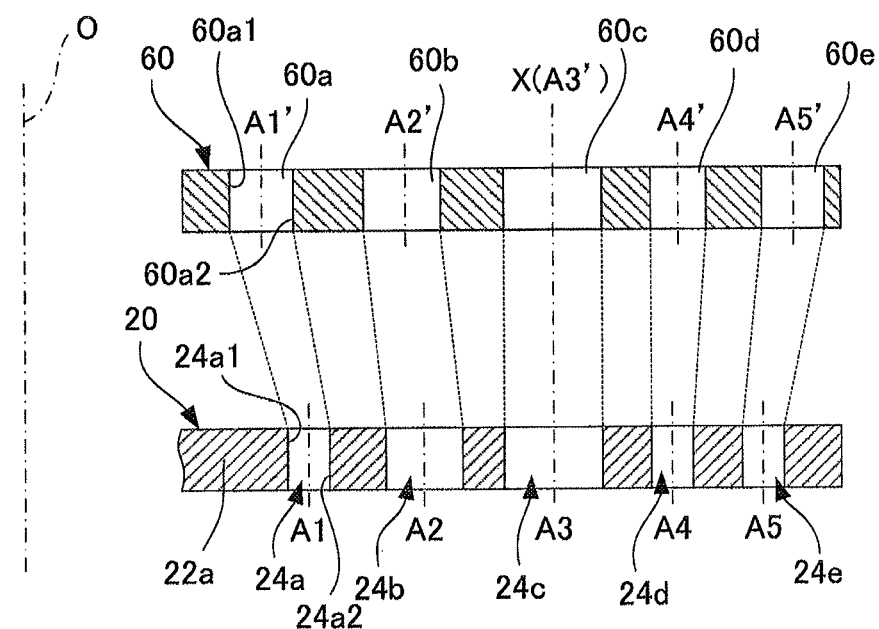
FIG. 3A is a diagram showing a positional relationship between slit arrays and light receiving parts.

FIG. 3A shows a positional relationship between the rotary plate and the light receiving parts of the encoder according to one embodiment. As shown in FIG. 3A, the encoder according to the present embodiment has the light detection unit 60 configured such that the central axis lines A1', A2', A4' and A5' of the light receiving parts 60a, 60b, 60d and 60e are positioned at a greater distance from the optical axis X than the central axis lines A1, A2, A4 and A5 of the corresponding slit arrays 24a, 24b, 24d and 24e. The central axis line A3 of the third slit array 24c substantially coincides with the optical axis X. In the light receiving part 60c corresponding to the third slit array 24c that extends across the optical axis X, a light crosstalk is unlikely to occur. Accordingly, the third slit array 24c and the corresponding light receiving part 60c may be aligned with each other. Thus, according to the encoder of the present invention, one or more light receiving part, in particular, the light receiving part arranged near the optical axis X may be aligned with the corresponding slit array. Although the third slit array 24c and the corresponding light receiving part 60c have the same width in the illustrated embodiment, the light receiving part 60c may be sized to have a greater width than the width of the third slit array 60c. In the latter case, the light receiving part 60c can detect an increased amount of light that spreads with respect to the optical axis X, so that the output level of the detection signal is increased.

In FIG. 3A, in order to emphasize the positional relationship between the slit arrays 24a to 24e and the light receiving parts 60a to 60e, the inner edge (the edge closer to the optical axis X) and the outer edge (the edge farther from the optical axis X) of each of the slit arrays 24a to 24e of the rotary plate 20 is connected by a dashed line with the inner edge and the outer edge of each of the light receiving parts 60 corresponding to the slit arrays 24a to 24e. For example, the outer edge 60a1 of the light receiving part 60a corresponding to the first slit array 24a is located at a greater distance from the optical axis X than the outer edge 24a1 of the first slit array 24a. In addition, the inner edge 60a2 of the light receiving part 60a is located at a greater distance from the optical axis X than the inner edge 24a2 of the first slit array 24a. Further, the width of the light receiving part 60a in the direction perpendicular to the optical axis X is sized to be greater than the width of the first slit array 24a.

In the present embodiment, the positional relationship and the width ratio between the slit arrays and the light receiving parts can be modified as necessary so as not to cause a light crosstalk. For example, according to one embodiment, the light receiving part may be configured such that only one of the inner and outer edges of the light receiving part is positioned at a greater distance from the optical axis X compared to that of the corresponding slit array. According to one embodiment, the light receiving part may be configured so as to be disposed within a range defined between the light blocking parts located on the opposite sides of the corresponding slit array. In this case, the light receiving part is disposed within a range defined between two lines that extend parallel to the optical axis from the inner edge of the light blocking part located on the inner side of the slit array and from the outer edge of the light blocking part located on the outer side, respectively.

According to one embodiment, the light receiving part may be configured such that at least one slit array and the corresponding light receiving part have the same width as each other, and the light receiving part is located at a greater distance from the optical axis X than the corresponding slit array (see the second slit array 24b and the corresponding light receiving part 60b in FIG. 3A). According to another embodiment, a light receiving part may have a width greater than the width of a corresponding slit array, while the inner edge of the light receiving part is aligned with the inner edge of the slit array (see the fourth slit array 24d and the corresponding light receiving part 60d in FIG. 3A).

Figure 3B:
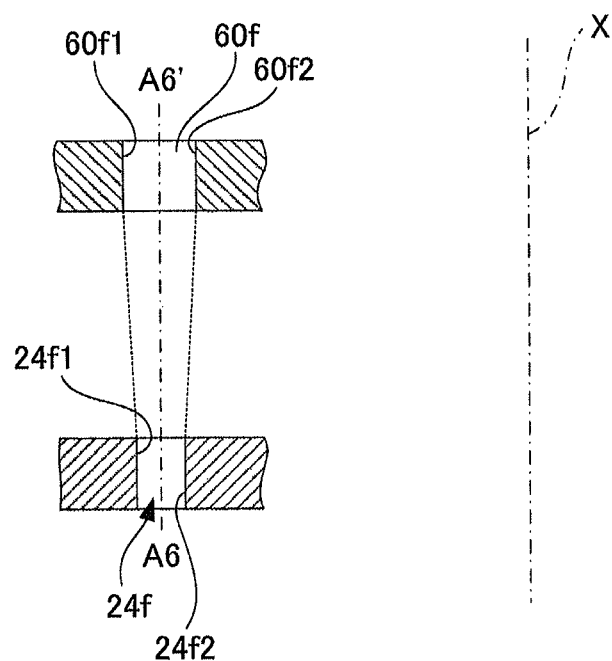
FIG. 3B is a diagram showing a positional relationship between a slit and a corresponding light receiving part.
Figure 3C:
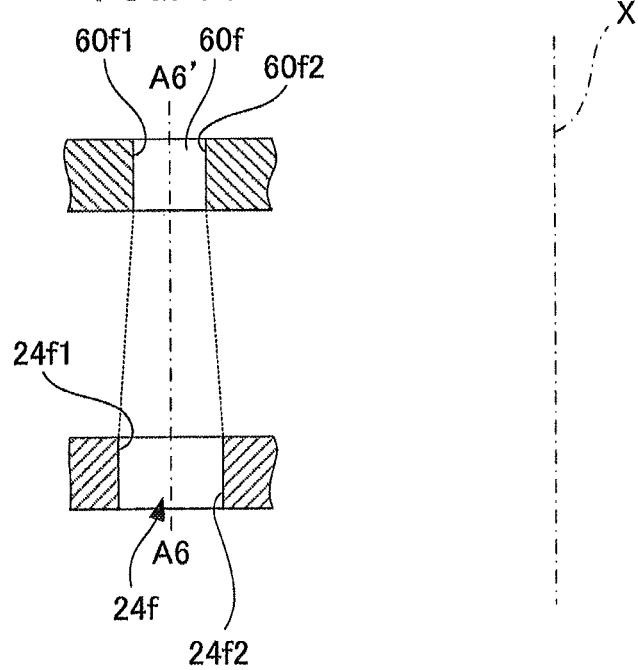
FIG. 3C is a diagram showing a positional relationship between a slit and a corresponding light receiving part.

FIGS. 3B and 3C each show a positional relationship between a slit array and a light receiving part in other embodiments. In the embodiments shown in FIGS. 3B and 3C, the slit array 24 is arranged such that the central axis line A6 of the slit array 24 is aligned with the central axis line A6' of the corresponding light receiving part 60f. As shown in FIG. 3B, the outer edge 60/1 of the light receiving part 60f is disposed at a greater distance from the optical axis X than the outer edge 24/1 of the slit array 24f. On the other hand, the inner edge 60/2 of the light receiving part 60f is disposed at a smaller distance from the optical axis X than the inner edge 24/2 of the slit array 24f. When the slit array 24f and the light receiving part 60f have the above-described positional relationship, it is possible to prevent a light crosstalk from occurring by enlarging the areas of the light blocking parts located on the opposite sides of the slit array 24f. In addition, since the light receiving part 60f is disposed over a range that is greater than the width of the slit array 24f, the output level of the detection signal obtained by the light receiving part 60f can be increased.

Referring to FIG. 3C, the outer edge 60/1 of the light receiving part 60f is disposed at a smaller distance from the optical axis X than the outer edge 24/1 of the slit array 24f. In addition, the inner edge 60/2 of the light receiving part 60f is disposed at a greater distance from the optical axis X than the inner edge 24/2 of the slit array 24f. When the slit array 24f and the light receiving part 60f have the above-described positional relation, it is possible to prevent a light crosstalk from occurring, without changing the range of the light blocking part, unlike the case of FIG. 3B.

Figure 4:
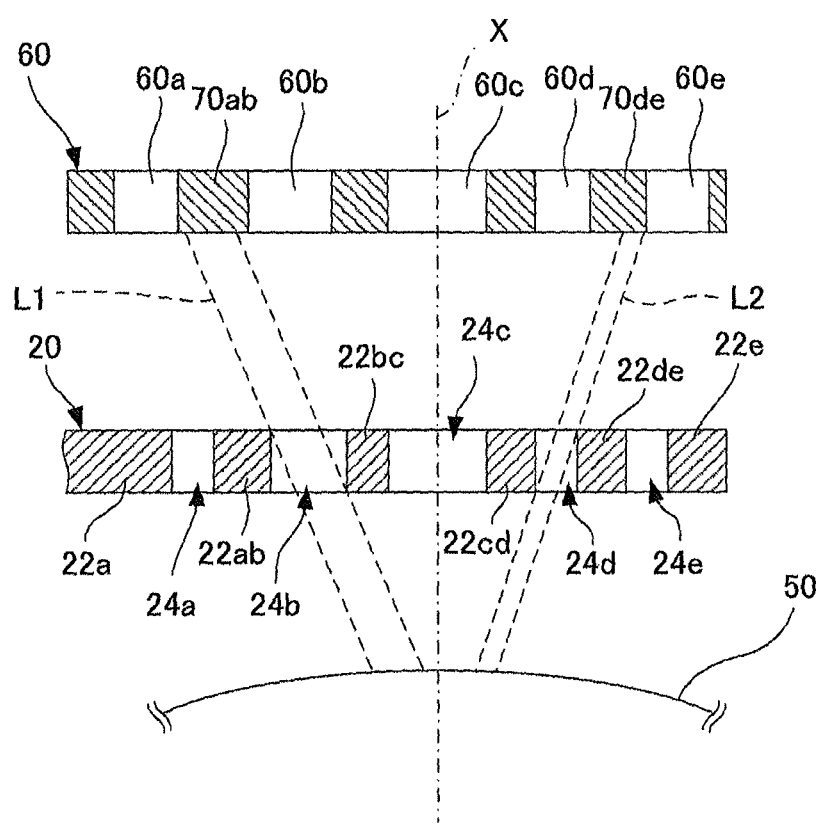
FIG. 4 is a diagram showing an exemplary behavior of light emitted from a light emitting part in an encoder according to one embodiment.
Figure 5:
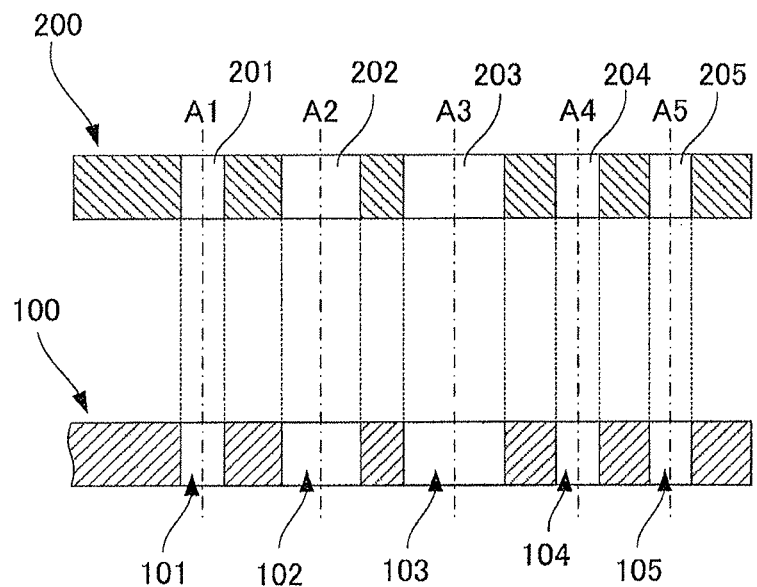
FIG. 5 is a diagram showing a positional relationship between a rotary plate and light receiving parts in an encoder according to a related art; and, FIG. 6 is a diagram showing an exemplary behavior of light emitted from a light emitting part in an encoder according to a related art.

FIG. 4 shows light that passes through the slit arrays and reaches the light receiving parts in the embodiment shown in FIG. 3A. A dashed line L1 indicates a light beam passing through the second slit array 24b. A dashed line L2 indicates a light beam passing through the fourth slit array 24d. According to the present embodiment, light receiving parts 60b and 60d are disposed at a greater distance from the optical axis X than the corresponding second and fourth slits 24b and 24d, respectively. Accordingly, as shown in FIG. 4, the light beams L1 and L2 directed at an angle relative to the optical axis X reach insensitive areas 70ab and 70de formed between adjacent light receiving parts. In other words, the light beams can be prevented from reaching light receiving parts 60a and 60e, whereby it is possible to prevent a light crosstalk from occurring.

According to the optical encoder of the present embodiment, a light crosstalk can be prevented from occurring, and therefore it is possible to improve detection accuracy of information on the operation. In addition, when light receiving parts having a greater width than that of the corresponding slit arrays are provided, the effective area of the light detecting unit is enlarged so that it is possible to enhance the output level of the detection signal. Further, according to the present embodiment, since the adverse effect of unparalleled light can be reduced, it is not necessary to use expensive additional optical elements, such as collimator lenses or optical fibers, etc., in order to realize ideal parallel light, thereby possibly providing an inexpensive optical encoder. Moreover, the information detected by the light receiving parts can be expected to be more reliable, so that the adjustment process of the encoder after assembly can be simplified, thereby improving productivity. Such an adjustment process is intended to adjust the positions of the light receiving parts and slits so as to maximize or optimize the output signals from the light receiving parts. When the detection accuracy of the encoder decreases due to light crosstalk, there is a possibility that the adjustment process takes a longer time, or that the encoder is determined as having a poor quality since the output signal cannot satisfy the specified values. In other words, according to the encoder of the present embodiment, the reliability of detected information can be improved, so that it is possible to carry out the adjustment process in a shorter period of time and perform quality examination.

Although the embodiments of the present invention have been described as a rotary encoder designed to detect information on rotational motion of a rotational object by way of example, the present invention can be applied in the same manner to a linear scale designed to detect information on linear motion.

Effect of the Invention

According to the optical encoder of the present invention, one of the inner and outer edges of the light receiving part is disposed at a greater distance from the optical axis than the edge of the corresponding slit array, so as to correspond to the spreading light from the light emitting part. This makes it possible to prevent a light crosstalk due to the light passing through a non-corresponding slit array from occurring. Therefore, the detection accuracy of the encoder can be improved.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. An optical encoder comprising:
a movable slit part that is movable integrally with a target object to be measured and has a plurality of slit arrays spaced apart from one another;
a light emitting part configured to emit light toward the plurality of slit arrays; and,
a plurality of light receiving parts arranged so as to correspond to the plurality of slit arrays and to detect light which is emitted from the light emitting part and passes through the plurality of slit arrays,
wherein at least one light receiving part of the plurality of light receiving parts has an inner edge located on an inner side relative to an optical axis of the light emitted from the light emitting part and an outer edge located on an outer side relative to the optical axis, at least one of the inner edge and the outer edge being disposed at a greater distance from the optical axis than an edge of a slit array corresponding to the at least one light receiving part, wherein the distance remains constant throughout operation of the optical encoder, and
wherein the at least one the light receiving part is disposed within a range defined between two lines that extend parallel to the optical axis from the inner edge of a first light blocking part located on the inner side of the slit array and from the outer edge of a second light blocking part located on the outer side of the slit array, respectively, the first and second light blocking part being a pair of light blocking part that extend adjacent to opposite sides of the slit array corresponding to the at least one light receiving part and that do not allow light to pass therethrough.

2. The optical encoder according to claim 1, wherein a width of the at least one light receiving part extending in a direction perpendicular to the optical axis is equal to a width of the slit array corresponding to the at least one light receiving part.

3. An optical encoder comprising:
a movable slit part that is movable integrally with a target object to be measured and has a plurality of slit arrays spaced apart from one another;
a light emitting part configured to emit light toward the plurality of slit arrays; and,
a plurality of light receiving parts arranged so as to correspond to the plurality of slit arrays and to detect light which is emitted from the light emitting part and passes through the plurality of slit arrays,
wherein at least one light receiving part of the plurality of light receiving parts has an inner edge located on an inner side relative to an optical axis of the light emitted from the light emitting part and an outer edge located on an outer side relative to the optical axis, at least one of the inner edge and the outer edge being disposed at a greater distance from the optical axis than an edge of a slit array corresponding to the at least one light receiving part, and
wherein a width of the at least one light receiving part extending in a direction perpendicular to the optical axis is greater than a width of the slit array corresponding to the at least one light receiving part, and
wherein the inner edge of the at least one light receiving part and the edge of the slit array corresponding to the at least one light receiving part are positioned at the same distance from the optical axis.

* * * * *